United States Patent

Suzuki et al.

[11] Patent Number: 5,847,483
[45] Date of Patent: Dec. 8, 1998

[54] PULSE GENERATOR

[75] Inventors: Yuzuru Suzuki; Sakae Fujitani; Kenichi Makino, all of Iwata-gun, Japan

[73] Assignee: Minebea Co., Ltd., Nagano, Japan

[21] Appl. No.: 861,066

[22] Filed: May 21, 1997

[30] Foreign Application Priority Data

Jun. 13, 1996 [JP] Japan ................................. 8-174273

[51] Int. Cl.$^6$ ......................... H02K 11/00; H02K 21/12; H02K 19/22
[52] U.S. Cl. ..................... 310/156; 310/168; 310/68 B; 324/207.15
[58] Field of Search .................. 310/68 B, 156, 310/168; 324/207.15

[56] References Cited

U.S. PATENT DOCUMENTS

5,109,193  4/1992  Pike .................................. 324/207.17
5,705,871  1/1998  Suzuki et al. ............................ 310/156

*Primary Examiner*—Clayton E. Laballe
*Attorney, Agent, or Firm*—Staas & Halsey

[57] ABSTRACT

An index signal is used for assuring media for use in a floppy disk drive to be exchangeable with each other. While the signal is output once for each rotation of a spindle motor, since the signal generation is carried out in a non-contact manner with rotating members including the medium, a hole sensor or the like has been previously used. However, such a hole sensor is expensive and fragile under temperature and mechanical stress. A pulse generator has been proposed, in which the rotor magnet is provided with magnets having unequally allocated angles and disposed all along a circumference and a stator coil and is disposed so as to match with the rotor magnet to have a pulse generated once for each rotation. However, the generated signal has, been poor in its S/N characteristic. It is an object of the invention to overcome the difficulties and provide a pulse generator that is highly reliable and excellent in the S/N characteristic with the manner of allocation of angles for the rotor magnet improved. A rotor assembly having a permanent magnet with a plurality, i.e., M pieces, of magnetic poles of opposite polarities to each other alternately disposed in a circumferential direction and a stator assembly having a plurality of stator coils disposed in confronting and coaxial relationship with rotor assembly, at least one set of the magnetic poles are set to have equally allocated angles from the center of the shaft. The remaining magnetic poles are set to have unequally allocated angles. The stator coils electromagnetically match the rotor assembly only once for each rotation thereof and a very large pulse is generated. In addition, a waveform with a satisfactory S/N characteristic can be obtained.

18 Claims, 8 Drawing Sheets

PULSE GENERATOR

BACKGROUND OF THE INVENTION

1. (Field of the Invention)

The present invention generally relates to a pulse generator. More particularly, it relates to a pulse generator outputting an effective electric signal once for each rotation of a rotor assembly and, still more particularly, it relate(s to improvements in the generated voltage characteristic (waveform) by an index generator for use in detecting the rotational position of a spindle motor for VTR, FDD, and the like.

2. (Description of the Related Art)

In order to assure that media for use in a 3.5-inch FDD, for example, are interchangeable with each other, an index signal is used. The index signal is generated by a spindle motor, once for each rotation thereof and used for accurately locating the absolute position of a rotating member for detection. To maintain the reliability of the signal at a high level, the signal is generally detected in a non-contact manner. In concrete terms, a magnet for generating an index signal is disposed at a position of a rotating member for detection and a magnetoelectric transducing element (for example a hole sensor that uses hole elements) is disposed at a stationary portion in confronting relationship with the magnet to thereby obtain an electric signal and the thus obtained electric signal is used for detecting the absolute position of the rotating member for detection.

However, the hole sensor formed of a semiconductor is expensive. It further has such demerits that its characteristic largely varies with temperature and it is fragile under electrical/mechanical stress. Therefore, attempts are being made to obtain means to supersede it.

As an example of such means, there is a system disclosed in Japanese Patent Application No. Hei 7-352205. This system has such a structure that all of allocated angles to magnetic poles on the rotor magnet side are made unequal and all of the pitches of the coils on the stator side confronting the rotor magnet are also made unequal the same as the rotor magnets. Hence, it is certain that the rotor magnets and stator coils accurately match with each other once for each rotation and an index signal is thereby generated. However, such a device has a defect that the voltage difference between the first peak value and the second peak value of the generated voltage is not large (their values are close to each other) and, hence, the so-called S/N characteristic (S/N ratio) is poor and, accordingly, waveform processing circuits in the subsequent stage becomes complicated. Also, there is a high risk of occurrence of error pulses due to changes in the environmental conditions (temperature/voltage and so on). Hence, improvements in the generated voltage characteristic (waveform) have been urgently demanded.

The present invention has been made under these circumstances. Accordingly, it is an object of the invention to improve the S/N characteristic of the generated voltage which has been poor and a defect in the prior art and to provide a pulse generator using a simple waveform processing circuit, being economical, and free from generation of error pulses.

SUMMARY OF THE INVENTION

In order to solve the above mentioned problems, the pulse generator according to the present invention, in a configuration of a rotor assembly having a permanent magnet formed of a plurality, M pieces (M is an even number being four or above), of magnetic poles of opposite polarities to each other alternately disposed in the circumferential direction and a stator assembly having a plurality of stator coils disposed in confronting and coaxial relationship with said rotor assembly, has one set or more of the magnetic poles with angles equal to each other in size, of angles (center angles) seen from the center of the rotor assembly, allocated thereto and all the other magnetic poles with angles unequal to one another allocated thereto, wherein the pitches of the stator coils are set such that the stator coils electromagnetically match with the confronting magnetic poles only once for each rotation of the rotor assembly.

Especially, in the above described configuration, when the rotor assembly is formed of M/2 pieces of S (N) magnetic poles with even (all equal) angles allocated thereto and M/2 piece,s of N (S) magnetic poles with angles unequal to one another allocated thereto and the pitches of the stator coils are set such that when the rotor assembly rotates the stator coils electromagnetically match with the confronting magnetic poles only once for each rotation of the rotor assembly, marked improvement s are produced in the generated voltage characteristic (waveform).

In the pulse generator configured as described above, when angles are allocated to the magnetic poles of the rotor assembly, the sizes of the allocated angles to the S (N) magnetic poles are made even (all equal to each other) and the allocated angles to the N (S) poles are made to be unequal to one another and, at the same time, the coils of the stator assembly are set so as to have corresponding pitches. Therefore, only in one position for each rotation of the pulse generator where the magnetic poles of the magnet in the rotor assembly are put in accurate electromagnetic matching with the coils in the stator assembly, positive and negative pulse-formed voltages distinctly greater than voltages generated (outputs) in other positions can be obtained. As a result, the pulse generator generates an accurate index signal once for each rotation.

Further, the effective voltage generated by the pulse generator can be made higher by setting the angles unequally allocated to some of the magnetic poles as described above to constitute virtually an arithmetical progression and setting the size of the even (all equal to each other) allocated angles to the remaining magnetic poles to assume a size equal to or smaller than the minimum size of the aforesaid unequally allocated angles.

Still further, when the coil is structured to be in a planar form as with a printed coil, it is made possible to minimize the effect of the external magnetic field by providing such a pattern (consisting, for example, of power generating line elements in radial directions, connecting line elements in a circumferential direction, and a return coil) that minimizes the area enclosed by the coil. In consequence, generated voltage with a good S/N characteristic can be obtained.

DESCRIPTION OF THE PREFERRED EMBODIMENTS

Below, in an exploded perspective view of FIG. 1, there is shown a pulse generator according to the invention in a case where it is incorporated in an end portion of a brushless DC motor of a radial gap type (where magnet poles of the pulse generator are provided at the end face of the rotor magnets of the motor so that an integral magnet structure is formed).

Figure 1:
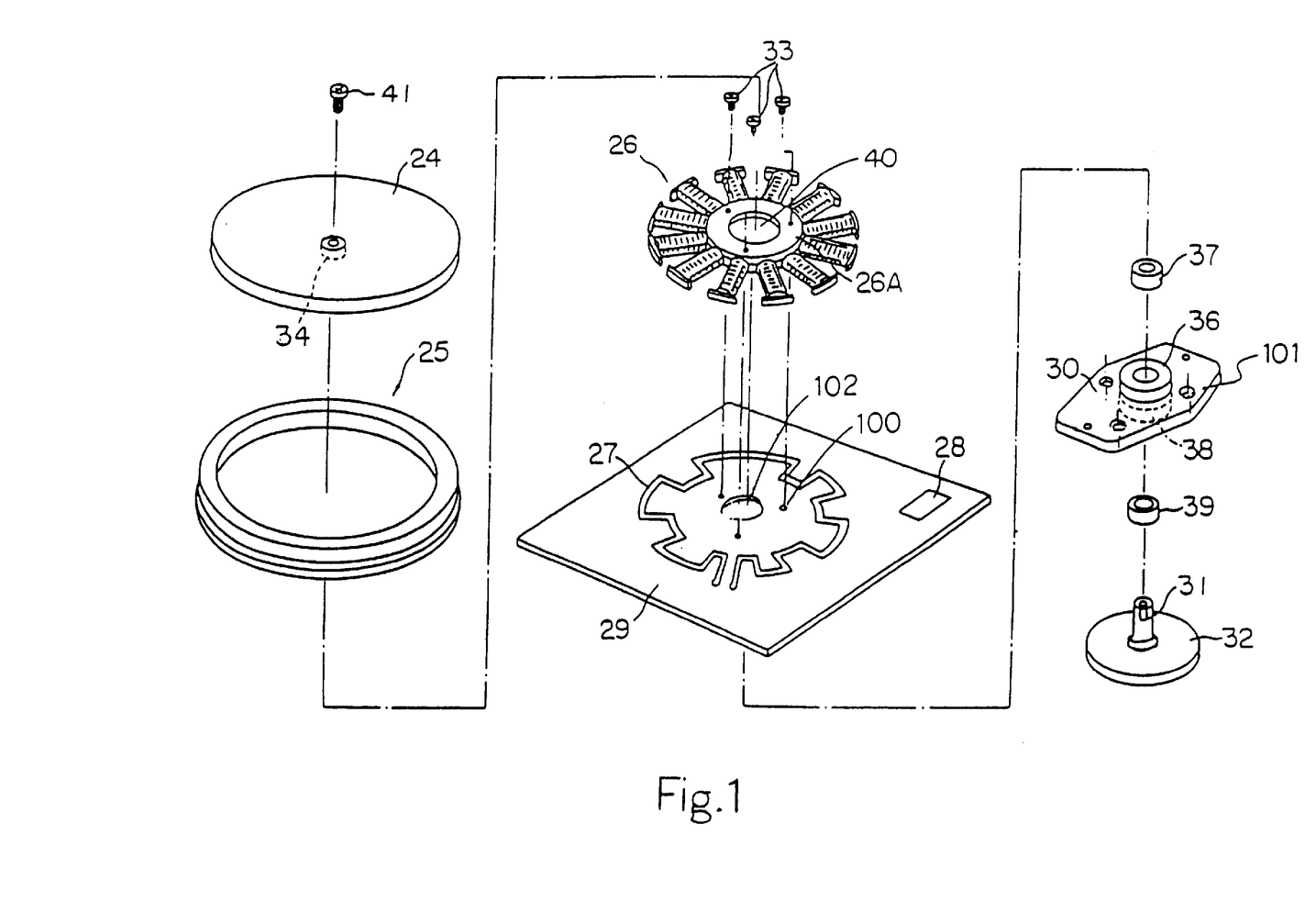
FIG. 1 is an exploded perspective view of a radial gap type brushless DC motor with a pulse generator incorporated therein according to the invention.

The configuration shown in FIG. 1 has a rotor cover 24, a rotor assembly (rotor magnet) 25 for common use for the motor and the pulse generator coaxially fixed to the rotor cover 24 by a suitable fixing means, a stator assembly 26 for the motor disposed within the rotor assembly 25, and a stator coil 27 for the pulse generator (a printed coil is used as an example in the present embodiment). Further, there are provided an electronic circuit board 29 having a motor driving IC 28 (shown by a mere block since a known type is used therefor) mounted thereon, a housing 30, and a revolving shaft 31. The revolving shaft 31 has a disk-formed coupling 32 attached thereto.

The stator assembly 26 for the motor has a disk-formed central portion 26A with a center hole 40 made therein, stator protrusions outwardly protruded in radial directions from the circumference of the central portion 26A and having, stator protruded members formed at their ends in the circumferential direction, and stator coils for the motor wound round the stator protrusions electrically insulated therefrom. In the present embodiment, the number of the stator protrusions is twelve. The stator assembly 26 for the motor is fixed to the housing 30 by set bolts 33, which are passed through three holes 100 in the electronic circuit board 29 and screwed into three tapped holes 101 made in the housing 30. At this time, a boss 36 of the housing 30 is fitted in the hole 102 made in the electronic circuit board 29 and the center hole 40 made in the stator assembly 26 for the motor. Further, the rotor cover 24 is fixed to the revolving shaft 31 at a boss portion 34 formed in the center of the rotor cover 24 by screwing a bolt 41 therein. The revolving shaft 31 is supported for rotation by means of ball bearings 37 and 39 provided at boss portions 36 and 38.

Figure 2:
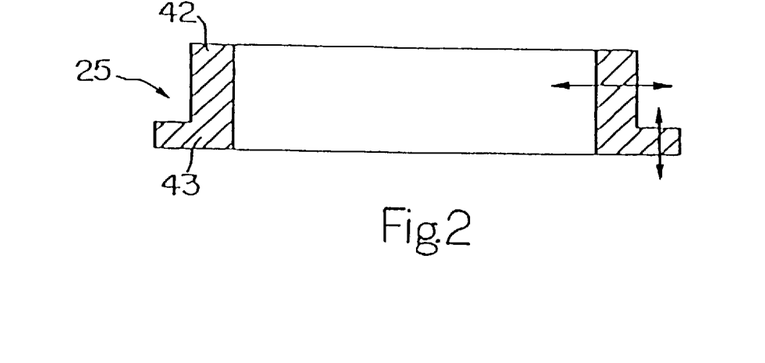
FIG. 2 shows a rotor assembly and directions of magnetization therein.

The rotor assembly 25 is formed of a rotor magnet 42 for the motor at the upper portion of which the direction of magnetization is in the radial direction and a rotor magnet 43 for the pulse generator at the lower portion of which the direction of magnetization is in the axial direction, as indicated by the two arrows in FIG. 2. This configuration not only has a merit that one piece of rotor magnet is commonly used for the motor and the pulse generator but also has a merit that the pulse generator portion can be produced in a flat and compact form.

The rotor magnet 42 for the motor and the rotor magnet 43 for the pulse generator of the rotor assembly 25 are each provided with N and S poles alternately disposed in the circumferential directions. However, for the rotor magnet 42 for the motor, the magnetic poles are allocated to an even number of 16 poles. No more description will be made as to the configuration of the motor including the magnet because it is not directly related to the present invention.

Now, the portions particularly important for this invention are described. It is the rotor magnet portion for the pulse generator and the stator coil portion for the same disposed coaxially with the rotor magnet portion and kept apart therefrom by a minute air gap.

First, the rotor magnet 43 will be described. In the present embodiment, as described above, the rotor magnet 43 is integrally formed with the rotor magnet 42 for the motor. In the case described below, M/2 pieces of the M pieces of magnetic poles of the rotor magnet 43 for the pulse generator are N poles and have unequal angles allocated thereto, while the remaining M/2 pieces of magnetic poles are S poles all of which have equal angles allocated thereto. In this case, the unequal angles allocated to the M/2 pieces of N poles constitute virtually an arithmetical progression.

Figure 3:
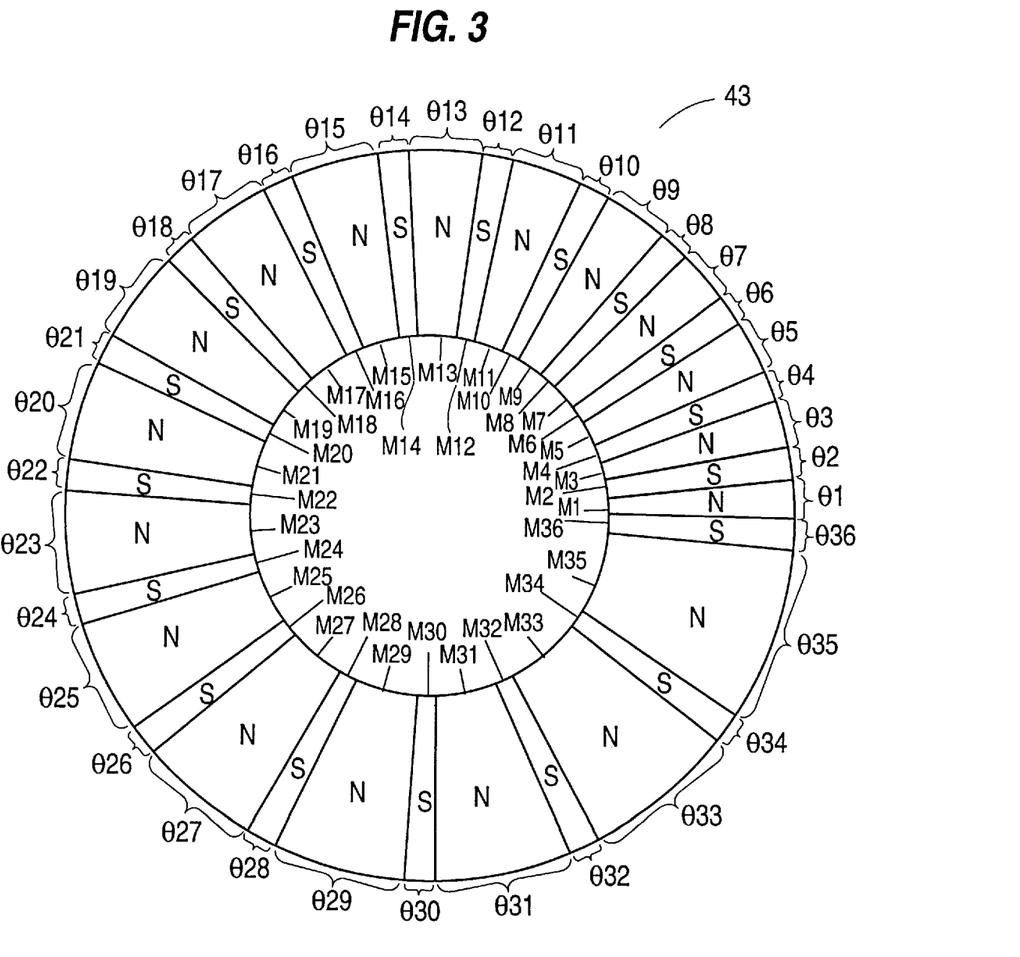
FIG. 3 is an arrangement drawing of magnetic poles of a magnet for a pulse generator of the invention.

The arrangement of magnetic poles in the magnet 43 for the pulse generator in the case of this embodiment is shown in FIG. 3. Referring to FIG. 3, the number of poles, M, is 36 ($\geq 4$) and the magnetic poles are denoted by M1 to M36 and corresponding central angles thereto are denoted by $\theta 1$ to $\theta 36$. Even-numbered poles (M2, M4, M6 ... M36) are S poles and odd-numbered poles (M1, M3, M5 ... M35) are N poles. All of the central angles of the even-numbered poles are equal ($\theta 2 = \theta 4 = \theta 6 ... = \theta 34$) and each thereof is 5 degrees. On the other hand, the central angles of the odd-numbered poles are set so as to constitute virtually an arithmetical progression of which the first term is 6 degrees and the common difference is 1 degree. To be concrete, $\theta 1 = 6$ degrees, $\theta 3 = 7$ degrees, $\theta 5 = 8$ degrees, $\theta 7 = 9$ degrees, ... $\theta 31 = 21$ degrees, $\theta 33 = 22$ degrees, and $\theta 35 = 32$ degrees.

While 17 central angles from $\theta 1$ to $\theta 31$ constitute the arithmetical progression in which the first term $\theta 1$ is 6 degrees and the common difference is 1 degree, only the last term $\theta 35$ is deviated from the arithmetical progression. This is because a fraction is produced when angles are allocated to the whole circumference (360 degrees) by the manner of setting of the first term (6 degrees in this present embodiment), the common difference (1 degree in this embodiment), and the number of terms (18 poles for both of the even-numbered/odd-numbered poles in this embodiment). This is the reason why the result that the last term $\theta 35 = 32$ degrees is obtained when it should be 23 degrees if it strictly follows the right arithmetical progression. In general, such a fraction is frequently produced though it is preferred that no fraction is produced. The way to cope with occurrence of a fraction is not limited to that described above.

For example, it is possible to set such that $\theta 1 = 6$ degrees, $\theta 3 = 7$ degrees, $\theta 9 = 8$ degrees, ..., $\theta 27 = 19$ degrees, $\theta 29 = 20$ degrees, $\theta 31 = 22$ degrees, $\theta 33 = 24$ degrees, and $\theta 35 = 29$ degrees, i.e., while 15 angles from $\theta 1$ to $\theta 29$ constitute an arithmetical progression of which the first term is 6 degrees and the common difference is 1 degree, three angles from $\theta 31$ to $\theta 35$ deviate from the arithmetical progression. When angles are allocated to the whole circumference, allocation according to an arithmetical progression generally produces a fraction and, hence, how to absorb the fraction includes not only the way how some angles deviate from the arithmetical progression but also the other way how the allocated angles constitute two or more arithmetical progressions each of which has different common differences. In a case, for example, angles are allocated such that θ1=6 degrees, θ3=7 degrees, θ9=8 degrees, . . . , θ27=19 degrees, θ29=20 degrees, θ31=22 degrees, θ33=25 degrees, and θ35=28 degrees, i.e., while the 15 angles from θ1 to θ29 constitute an arithmetical progression of which the first term is 6 degrees and the common difference is 1 degree, the three angles from θ31 to θ35 constitute another arithmetical progression of which the first term is 22 degrees and the common difference is 3 degrees.

Although the 18 magnetic poles with unequal angles allocated thereto are all N poles in the above described embodiment, the magnetic poles with unequal angles allocated thereto are not limited to N poles. For example, 9 poles of 18 pieces of N poles may have unequal angles allocated thereto and the remaining 9 poles may have equal angles allocated thereto and, similarly, 9 poles of 18 pieces of S poles may have unequal angles allocated thereto and the remaining 9 poles may have equal angles allocated thereto. At this time, it, of course, is preferred that the unequally allocated 18 angles, in all, to the magnetic poles would substantially constitute arithmetical progression.

Further, while it is preferred that all of the equal angles allocated to 9 pieces of N poles and 9 pieces of S poles be equal to each other, they should not necessarily be equal. For example, such a change may be made that the equally allocated angles to the 9 pieces of N poles are 4.5 degrees and the equally allocated angles to the 9 pieces of S poles are 5 degrees.

In obtaining a higher effective generated voltage, it is preferred that the angle equally allocated to magnetic poles be as small as possible. However, it naturally creates a difficulty in magnetization. Therefore, in the present embodiment, the angle is set to 5 degrees down to which magnetization is possible. The size of this angle is still smaller than 6 degrees which is the minimum value of the angles of the unequally allocated magnetic poles. By such setting, it was made possible to increase the generated voltage. (Refer to FIG. 6 and FIG. 7 for comparison.)

Figure 4:
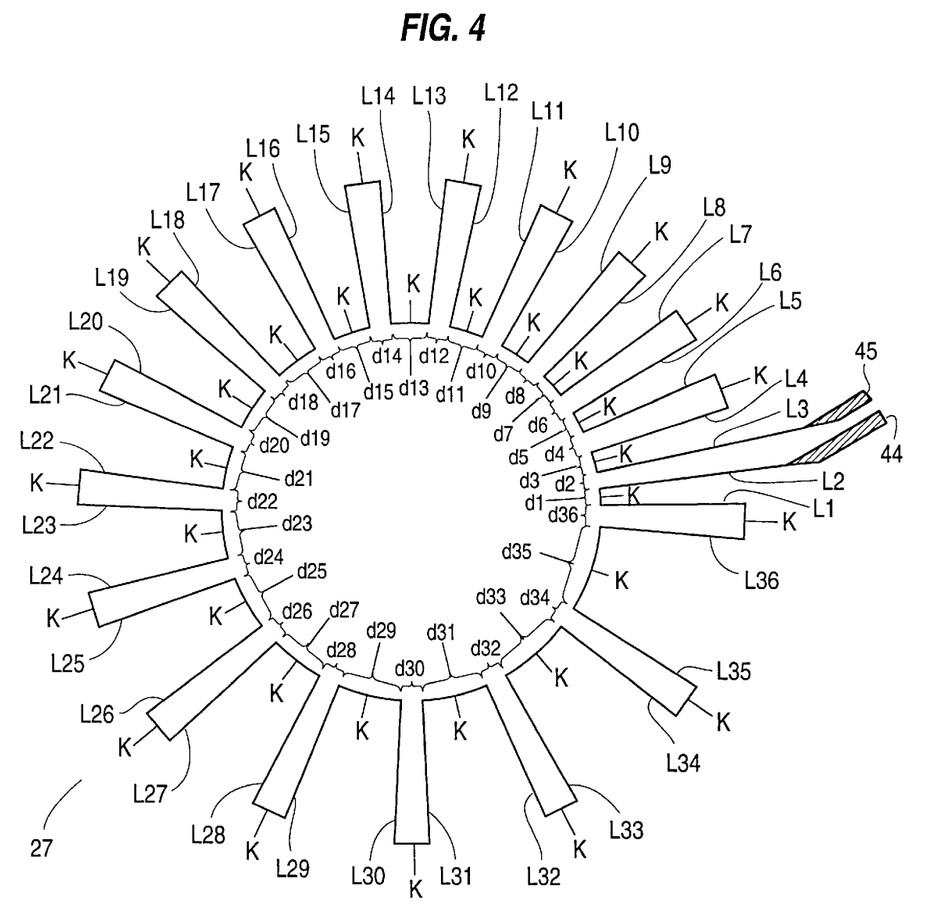
FIG. 4 shows an example of a stator coil formed on an electronic circuit board.

Now, the stator coil for the pulse generator will be described. FIG. 4 shows a first embodiment, i.e., an example of a printed coil 27 which is a kind of stator coil formed on an electronic circuit board 29. The printed coil 27 is made up of power generating line elements L1 to L36 extending in radial directions (which are line elements for generating the effective generated voltage by electromagnetic action with the rotor magnet 43 corresponding thereto and are numbered in a counterclockwise direction) and circular arc-formed connecting line elements K for connecting the starting points and the ending points of the power generating line elements. Both the line elements together form a zigzag. The central angles formed between each two adjoining power generating line elements (which correspond to the central angles formed by the connecting line elements K) are arranged in the same way as the magnetic poles of the rotor magnet 43 for the pulse generator.

The number of the power generating line elements L in this embodiment is 36. When the central angles formed between adjoining two power generating line elements are denoted by a1 to a36, shown in FIG. 4, even-numbered central angles (a2, a4, a6 . . . a36 are equal to each other (i.e., 5 degrees) and odd-numbered central angles (a1, a3, a5, . . . a35) are set to constitute virtually an arithmetical progression of which the first term is 6 degrees and the common difference is 1 degree. However, only the angle a35 is set to 32 degrees and deviates from the arithmetical progression, as with the angle θ35 of the magnet 42 for the pulse generator.

It, of course, is necessary to change the allocation of the coil on the stator side according to the manner of allocation of the magnetic poles on the side of the rotor magnet 43, which is changed as aforementioned in the description of various manners of allocation of magnetic poles for the rotor magnet 43.

The second line element L2 is connected with an output terminal 44 at the outgoing portion and, likewise, the third line element L3 is connected with an output terminal 45 at the outgoing portion. The generated voltage is adapted to be taken out from the output terminals 44 and 45. The generated voltage taken out therefrom is used for generating an index signal by means of an ordinary waveform processing circuit (description thereof is omitted here). The positions of the output terminals are, of course, not limited to those described above.

The rotor magnet portion (the rotor magnet 43 for the pulse generator) is disposed over the stator coil portion (the printed coil 27), structured as described above, in confronting and coaxial relationship therewith and thereby the pulse generator is formed. The rotor magnet and the stator coil disposed as described above and in their best electromagnetically matched state are shown in a plan view of FIG. 5.

Figure 5:
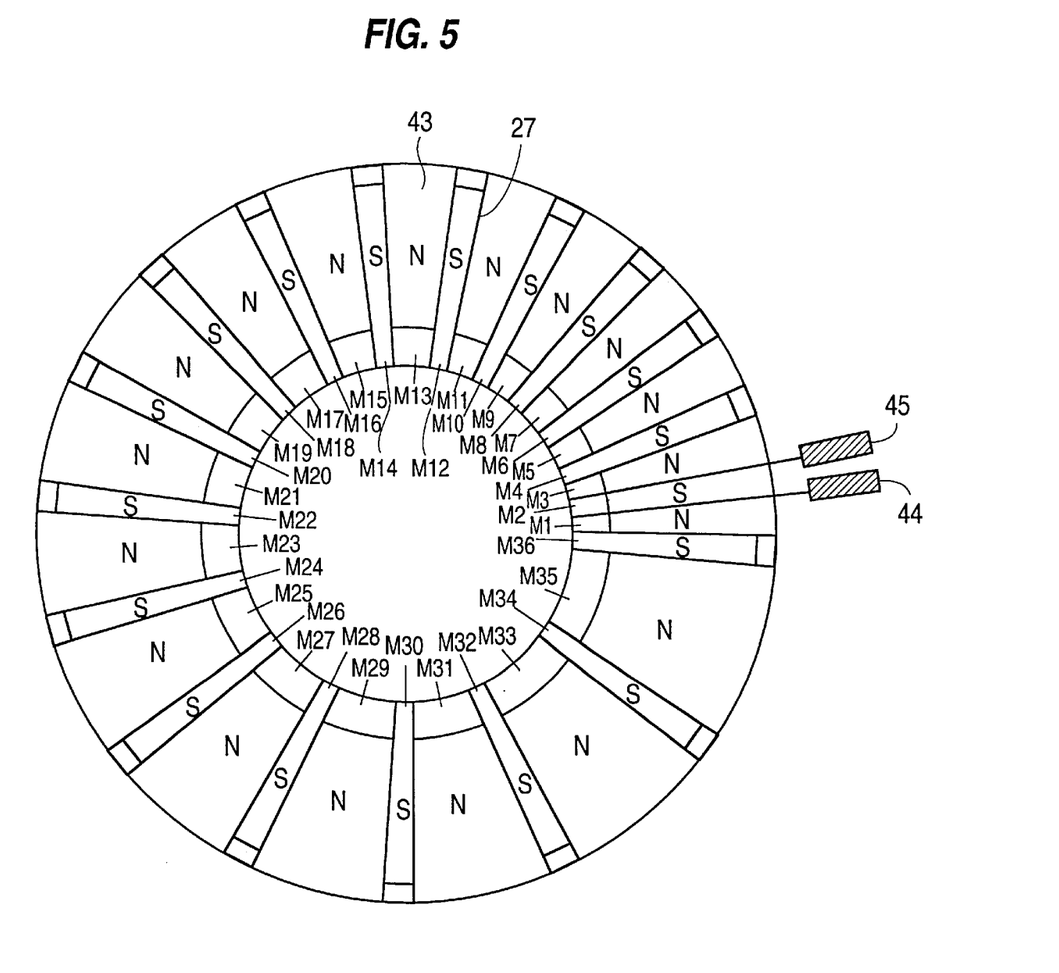
FIG. 5 shows the rotor magnet portion and the stator coil portion of the invention in their best electromagnetically matched state.

FIG. 5 shows a moment when the rotor magnet 43 and the stator coil 27 are electromagnetically matched, i.e., the circumferential positions of the magnetic poles M1 to M36 of the rotor magnet 43 for the pulse generator of the rotor assembly 25 are in complete agreement with the center lines of the corresponding portions between the power generating line elements L1 to L36. In the present invention, the above state is brought about once for each rotation of the rotor magnet 43.

Figure 6:
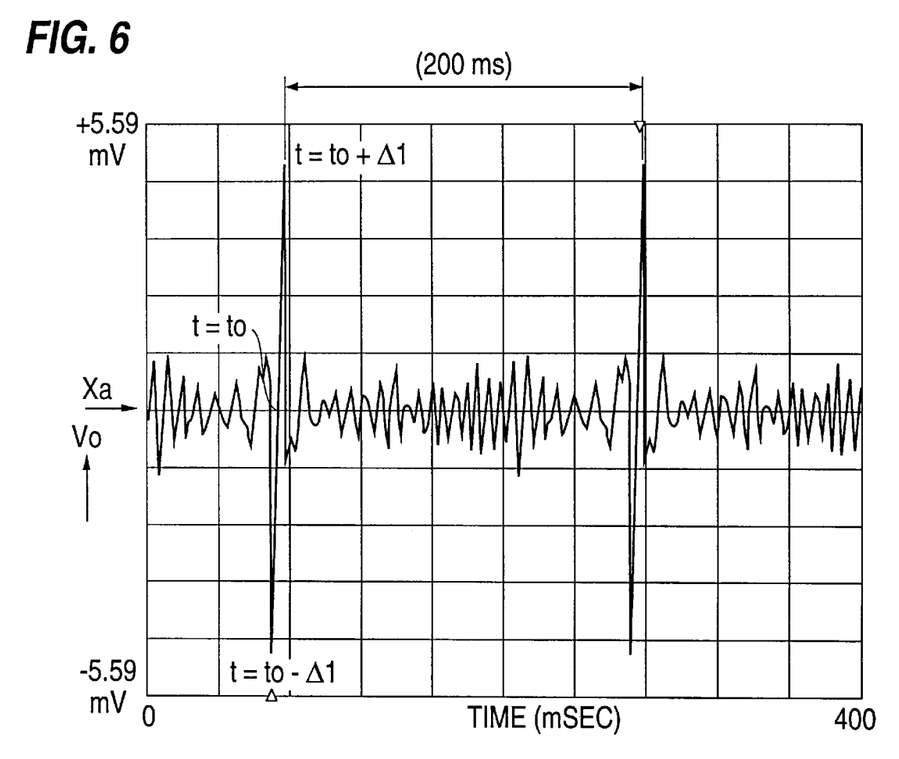
FIG. 6 is a generated voltage characteristic of a pulse generator of the invention.

A characteristic of the generated voltage by the pulse generator against time is shown in FIG. 6. The moment when t=t0 (73 ms) in FIG. 6 corresponds to when the rotor magnet is in the state shown in FIG. 5.

As shown in FIG. 6, the generated voltage V0 takes on the maximum negative value (V0=−4.8 mV) at the time t=t0−Δ1 (71 ms), it becomes V0=0 (mV) at the time t=t0 (73 ms), and it takes on the maximum positive value (V0=4.8 mV) at the time t=t0+Δ1 (75 ms). At other times, V0 takes on very small values (|V0|<1.4 mV). By employing the electric or electronic waveform processing techniques today, it is very easy to accurately determine the point of time t=t0 where the generated voltage V0 in FIG. 6 becomes V0=0 when the generated voltage V0 changes from its negative maximum value to its positive maximum value, i.e., the zero-cross point of the generated voltage V0. Therefore, stabilized detection of the rotational position of the rotating member for detection can be achieved.

Figure 7:
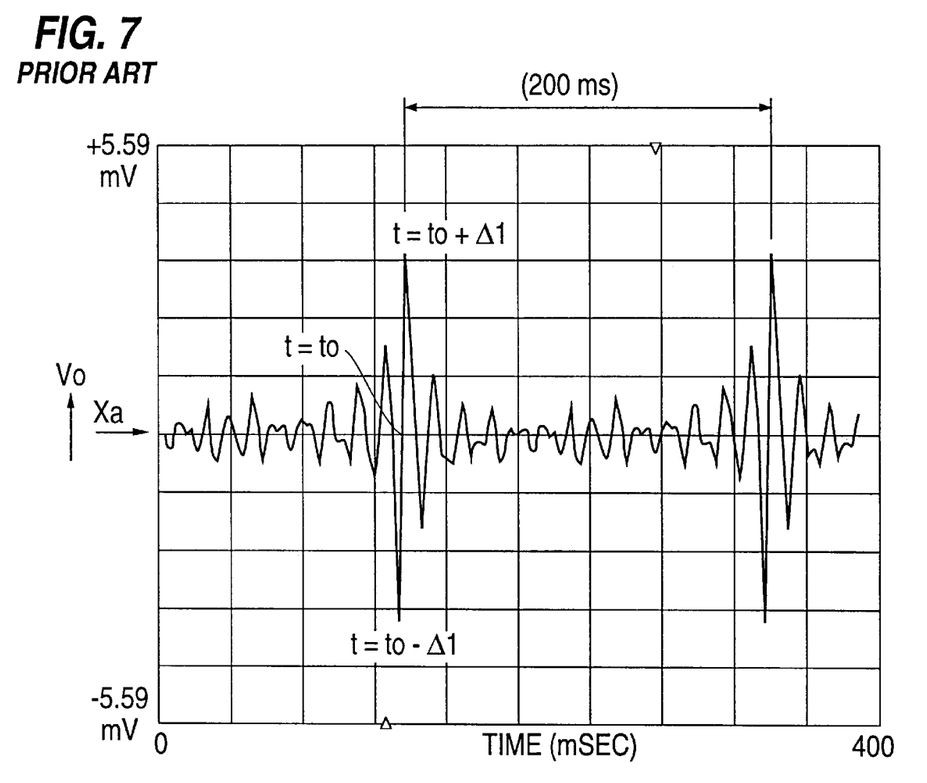
FIG. 7 is a generated voltage characteristic of a pulse generator of a prior art.

A generated voltage characteristic against time of a pulse generator in a prior art is shown in FIG. 7 for comparison. By comparison, it is obvious that the generated voltage characteristic of the invention is much improved in the S/N characteristic in the general waveform including the first peak value and the second peak value. It is also known that the peak-to-peak value of the generated voltage in this embodiment is large.

Figure 8:
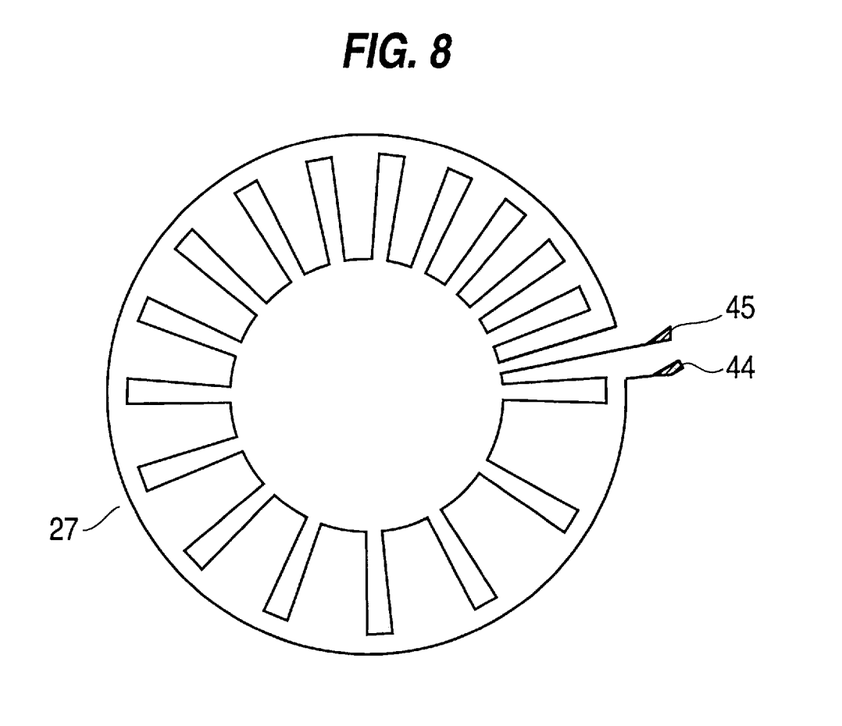
FIG. 8 shows an embodiment of the invention in which the stator coil portion is formed of a printed coil with a return coil attached thereto.

FIG. 8 shows a second embodiment of the stator coil formed of a printed coil. In FIG. 8, a case of a printed coil 27 with a return coil attached thereto is shown. In the case of the stator coil as shown in FIG. 4, the return coil is connected in series to its output terminal and disposed such that it encloses the printed coil by a concentric circular arc. At this time, it is preferred ;hat the plane area enclosed by the coils be minimized (description thereof will be given later).

The function of the return coil will now be described. A noise voltage is produced by interlinkage of the leakage magnetic flux generated from the connected motor portions (magnetic field due to the exciting currents passed through the rotor magnet 42 for the motor and the stator assembly 26) with the printed coil 27. However, a noise voltage virtually at the same level is produced in the attached return coil. Since they are connected such that the noises cancel each other, it, as a result, is made possible to cancel the noise voltage due to the leakage flux. Thus, by the addition of the return coil, the deterioration in the S/N characteristic of the generated voltage can be prevented.

The return coil should not necessarily be of such a concentric circular arc form. The return coil, in substance, may include any of such line elements that are connected in series with the power generating line element to cancel the noise voltage produced by changes in the magnetic field in the axial direction. Although no specific description is given here, it is effective to incorporate the return coil in the terminal portion of an axial gap type motor which generates a magnetic field in the axial direction from its motor portion, a claw-pole type stepping motor which has a large solenoid coil disposed in the axial direction, and the like.

Figure 9A:
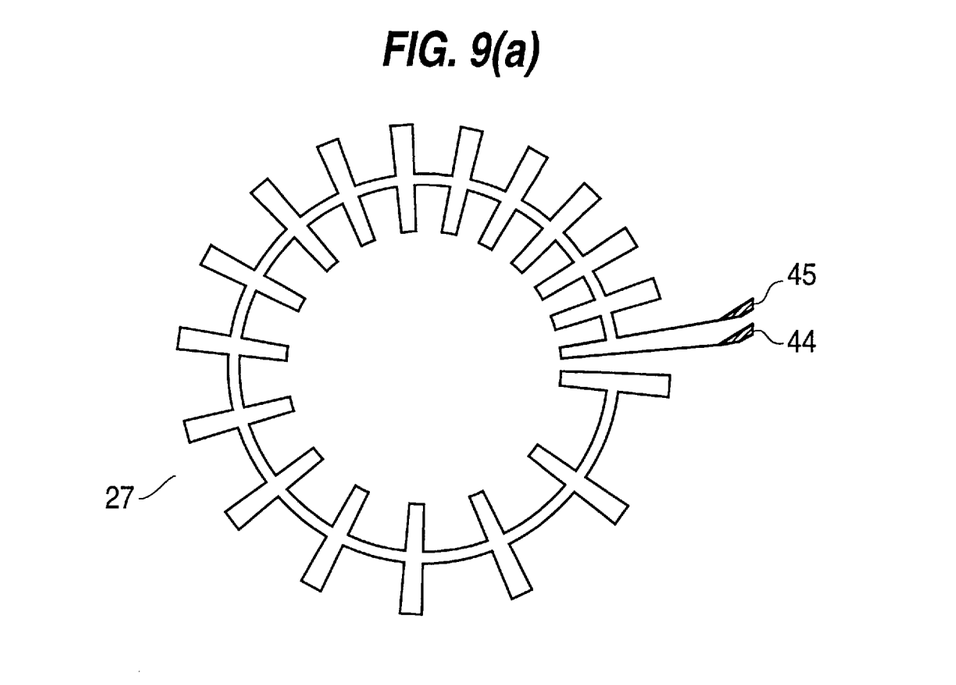
FIG. 9a shows an example of the invention in which the area enclosed by a printed coil is small.
Figure 9B:
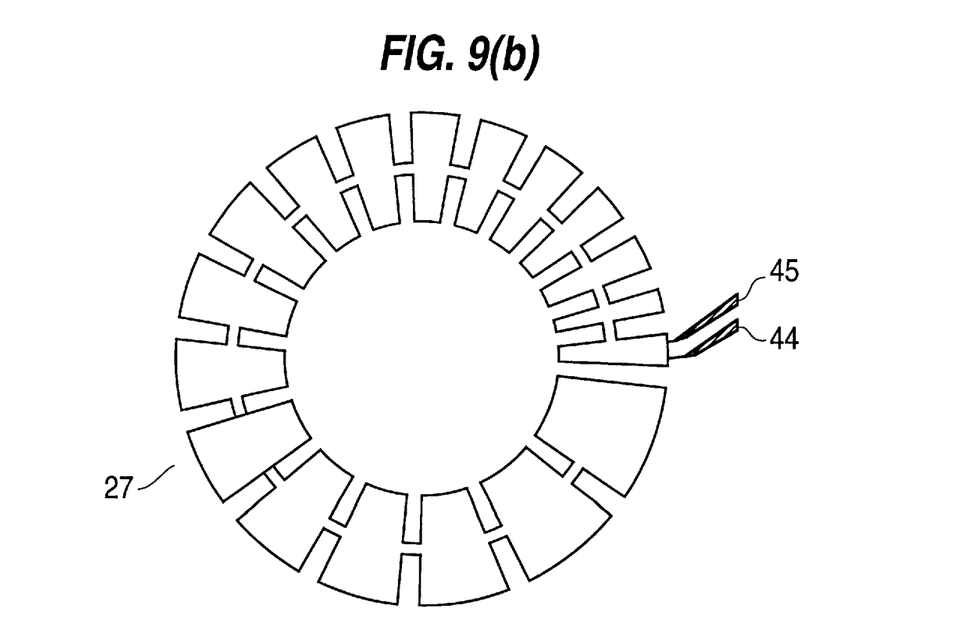
FIG. 9b shows an example of the invention in which the area enclosed by a printed coil is large.

FIG. 9 shows examples of other stator (printed) coils as a third embodiment. FIG. 9(a) shows a case where the plane area enclosed by the printed coil is made small and FIG. 9(b) shows a case where the plane area enclosed by the printed coil is conversely made large. Thus, in the present invention, there are two ways in the line layout for the power generating line elements of the same function.

Either of those shown in FIG. 9(a) and FIG. 9(b) is configured to cancel the leakage magnetic flux from the motor and the like in the same manner as described above. However, for the reason as described below, what is shown in FIG. 9(a) in which the plane area enclosed by the printed coil is smaller, is preferred. The reason is that the component of the leakage magnetic flux, especially that in the axial direction (perpendicular to the plane in which the printed coil is developed) interlinks with the printed coil and produces the noise voltage. Accordingly, in order to make the amount of interlinkage with the leakage magnetic flux in the axial direction as small as possible, it becomes necessary to make the plane area enclosed by the stator coil 27 absolutely small. In this regard, that shown in FIG. 9(a) is preferable. Also from the point of view to make the area smaller, it is preferred that the above described equally allocated angle to magnetic poles be set as small as possible.

The present invention is not limited to those configured as described above but can be configured in various ways as long as the same do not depart from the spirit of the present invention. The coil is not limited to a printed coil but it may be the one using an iron core with a wire coiled around the iron core. Also t is not necessary to dispose the coil all along the circumference. Especially in the case of the printed coil, it is not necessary to place the pattern all along the circumference of 360 degrees (some power generating line elements may be decimated) though the generated voltage is then lowered. Also with the arrangement of magnetic poles of the magnet, it is not necessary to magnetize all the poles along the circumference (there may be some non-magnetized poles therein or part of the magnet may be cut off).

Further, such a configuration may be possible in which the pulse generator is fabricated as a single body and attached to the rotated member by means of a coupling or the like.

According to the present invention, the S/N characteristic of the voltage generated by a pulse generator can be greatly improved without raising its cost. Especially because a high voltage difference can be obtained between the first peak value and the second peak value, the waveform processing circuit in the subsequent stage can be configured very simply and at low cost and, hence, the total cost including electronic circuits can be reduced. Further, such an effect can be obtained that erroneous generation of the index signal due to changes in the environmental conditions (temperature/voltage and the like) can be eliminated.

What is claimed is:

1. A pulse generator having a rotor assembly formed of M pieces, M being an even number greater than or equal to four, of permanent magnetic poles having opposite polarities to each other alternately disposed thereon in the circumferential direction and a stator assembly formed of a plurality of stator coils disposed thereon in confronting and coaxial relationship with said rotor assembly, said pulse generator comprising:

each of the magnetic poles having a center angle viewed from the center of said rotor assembly;

a part of the magnetic poles consisting of at least one set of poles of which center angles equal each other in size;

another part of the magnetic poles having center angles unequal to one another in size; and said stator coils having such pitches as to electromagnetically match with said magnetic poles once for each rotation of the rotor assembly.

2. A pulse generator according to claim 1, wherein M/2 pieces of said M pieces of magnetic poles are set to one type of polarity and all of the remaining M/2 pieces are set to another type of polarity.

3. A pulse generator according to claim 1, wherein at least one set of the magnetic poles with center angles equal to each other numbers less than M/2 and has the same polarity of one type, M/2 pieces of the magnetic poles with center angles unequal to each other are set to the same polarity of the other type, and all of the remaining magnetic poles with unequal angles are set to the same polarity of the one type.

4. A pulse generator according to claim 1, wherein at least one set of the magnetic poles with angles of equal size allocated thereto numbers more than M/2 and any M/2 pieces of said magnetic poles are set to the same polarity of one type and the remaining magnetic poles with equal angles allocated and all of the magnetic poles with unequal angles allocated thereto are set to the same polarity of another type.

5. A pulse generator according to claim 1, wherein said magnetic poles with angles of equal size allocated thereto are at least one set and the total number of the magnetic poles with angles of equal size allocated thereto is set to M/2.

6. A pulse generator according to claim 5, wherein all of said magnetic poles with equal angles allocated thereto are set to the same polarity of one type, and all of the remaining magnetic poles with unequal angles allocated thereto are set to the same polarity of another type.

7. A pulse generator according to claim 1, wherein said unequal center angles allocated to the magnetic poles are set to constitute an arithmetical progression from a starting angle to a final angle, said final angle being larger than the starting angle.

8. A pulse generator according to claim 1, wherein a minimum angle of those allocated to each set of the magnetic poles having equal center angles is set to be equal to or smaller than a minimum value of the sizes of unequally allocated angles.

9. A pulse generator according to claim 1, wherein said stator coils are formed of a printed coil.

10. A pulse generator according to claim 1, wherein an arbitrary even number of magnetic poles of said M pieces of magnetic poles are left non-magnetized and thereby the number of the magnetic poles is decreased.

11. A pulse generator according to claim 1, wherein magnetization of magnetic poles of the rotor assembly commonly used for the motor and the pulse generator is carried out such that the magnetic pole for the motor generates a strong magnetic field and the magnetic pole for the pulse generator generates a weak magnetic field.

12. A pulse generator according to claim 1, wherein a number of power generating line elements forming said stator coil are in some cases disposed all along a circumference while in other cases said power generating line elements are disposed along at least a part of the circumference.

13. A pulse generator according to claim 9, wherein a number of power generating line elements formed said printed coil does not equal a number of said magnetic poles.

14. A pulse generator according to claim 9, wherein a return coil of a printed form is connected in series with an output terminal of said printed coil and disposed in a circumferential direction of the circumference.

15. A pulse generator according to claim 14, wherein said return coil is arranged such that an area enclosed by said return coil disposed in the circumferential direction, a number of power generating line elements and a number of connecting line elements are minimized.

16. A pulse generator according to claim 9, wherein said printed coil is formed of two zigzag patterns disposed in a concentric circular manner and zigzag coils are connected in series with each other so that voltages generated in each of power generating line elements are added together.

17. A pulse generator according to claim 16, wherein said printed coil is disposed such that an area enclosed by said zigzag coils is minimized.

18. A pulse generator comprising:

a rotor assembly including a rotor magnet;

a stator;

a stator coil;

wherein said rotor magnet includes M/2, M being an even number greater than or equal to four, magnetic poles separated by equal angles, and M/2 magnetic poles separated by unequal angles, and a time required for said pulse generator to go from generating a maximum negative voltage to a maximum positive voltage is minimized as are fluctuations therearound.

* * * * *